United States Patent [19]
Poll et al.

[11] Patent Number: 5,242,992

[45] Date of Patent: Sep. 7, 1993

[54] POLYAMIDE MOLDING COMPOUND

[75] Inventors: Günter Poll; Jürgen Finke, both of Marl; Harald Modler, Bochum; Horst Beyer, Marl, all of Fed. Rep. of Germany

[73] Assignee: Hüls Aktiengesellschaft, Marl, Fed. Rep. of Germany

[21] Appl. No.: 888,005

[22] Filed: May 26, 1992

[30] Foreign Application Priority Data

Jun. 12, 1991 [DE] Fed. Rep. of Germany ....... 4119300

[51] Int. Cl.$^5$ .............................................. C08L 77/10
[52] U.S. Cl. ...................................... 525/432; 528/172
[58] Field of Search .......................... 525/432; 528/172

[56] References Cited

U.S. PATENT DOCUMENTS

| 4,612,353 | 9/1986 | Andrews | 525/432 |
| 4,749,768 | 6/1988 | Finke | 528/172 |
| 4,792,590 | 12/1988 | Zecher | 525/424 |

FOREIGN PATENT DOCUMENTS

| 0429771 | 8/1990 | European Pat. Off. . |
| 6147848 | 11/1981 | Japan . |
| 0231759 | 10/1985 | Japan . |
| 2006555 | 1/1990 | Japan . |

*Primary Examiner*—James J. Seidleck
*Assistant Examiner*—I. S. Zemel
*Attorney, Agent, or Firm*—Oblon, Spivak, McClelland, Maier & Neustadt

[57] ABSTRACT

1. A polyamide molding compound, comprised of:
(I) an aromatic polyamide having the structure

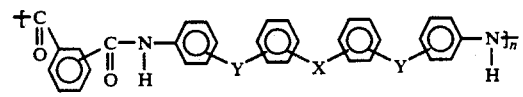

where
n is a number between 5 and 500; X represents —SO$_2$— or —CO—, and
Y represents —O— or —S—; and (II) an amorphous polyamide.

8 Claims, No Drawings

POLYAMIDE MOLDING COMPOUND

BACKGROUND OF THE INVENTION

1. Field of the Invention

The present invention relates to polyamide molding compounds.

2. Description of the Background

Molding compounds based on aromatic polyamides which have the basic structure:

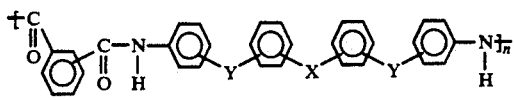

are generally known (Ger. OS 36 09 011). Also known are polyamide molding compounds which have an amorphous structure (Eur. Pat. 0,053,876, Eur. OS 0,271,308; and Ger. OS 36 00 015). These amorphous molding compounds in particular have unsatisfactory heat resistance and unsatisfactory endurance temperature. A need therefore continues to exist for aromatic polyamides which provide for molding compounds of improved properties.

SUMMARY OF THE INVENTION

Accordingly, one object of the present invention is to provide a molding polyamide compound which exhibits improved thermal properties.

Briefly, this object and other objects of the present invention are hereinafter will become more readily apparent can be attained in a molding compound which comprises (I) an aromatic polyamide having the formula:

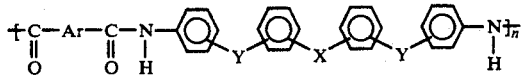

where

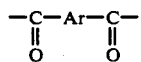

designates an aromatic dicarboxylic acid, n is a number between 5 and 500; X represents —$SO_2$— or —CO—, and Y represents —O— or —S—; and (II) an amorphous polyamide.

DETAILED DESCRIPTION OF THE PREFERRED EMBODIMENTS

The preferred molding compounds of the present invention have a ratio b weight of component I to component II in the range 99:1 to 1:99, preferably in the range 90:10 to 10:90. The polyamides (component I) are prepared from aromatic dicarboxylic acids which include isophthalic acid, terephthalic acid, 1,4-, 1,5-, 2,6- and 2,7-naphthalenedicarboxylic acid, 4,4'-diphenyl ether dicarboxylic acid, 4,4'-benzophenonedicarboxylic acid, 4,4'-diphenylsulfone dicarboxylic acid, 2-phenoxyterephthalic acid, 4,4'-biphenyldicarboxylic acid and mixtures thereof. Preferred is isophthalic acid alone or a mixture of isophthalic acid and another of the above-mentioned acids. In the case of a mixture, up to 45 mol % of the isophthalic acid is replaced by the other acid.

Suitable examples of aromatic diamines include 4,4'-bis(4-amino-phenoxy)diphenylsulfone, 4,4'-bis(3-aminophenoxy)diphenylsulfone, 4,4'-bis(4-aminophenoxy)benzophenone, 4,4'-bis(3-aminophenoxy)benzophenone, 4,4'-bis(p-aminophenylmercapto)benzophenone, 4,4'-bis(p-aminophenylmercapto)diphenylsulfone, and mixtures thereof. Preferred is 4,4'-bis(4-aminophenoxy)diphenylsulfone.

The molar ratio of dicarboxylic acid to diamine employed is in the range of c. 0.9:1 to 1:0.9.

In order to achieve improved hydrolysis resistance of the aromatic polyamide (component I), an additional 0.01-10 mol %, based on the sum of the dicarboxylic acid and the diamine, of a low molecular weight aliphatic, araliphatic, or aromatic carboxylic acid amide may be added to the compound. The aromatic group here may contain halogen substituents or $C_1$-$C_4$ alkyl group substituents. These measures are described in Ger. OS 38 04 401.

The hydrolysis resistance of the compound can also be improved by employing the dicarboxylic acid in slight excess (Ger. OS 39 35 467), or, with the dicarboxylic acid and diamine present in approximately equimolar amounts, by further adding a monocarboxylic acid (Ger. OS 39 35 468) to the reacting ingredients.

The basic method of manufacturing aromatic polyamides is known. It is described, among other places, in Ger. OS 36 09 011.

Preferably a phosphorus-containing catalyst is employed in the manufacture of the aromatic polyamides. Suitable catalysts include, particularly, acids of the formula: $H_3PO_a$, where a=2 to 4, or derivatives of such acids. Examples include, in particular, phosphoric acid, phosphorous acid, hypophosphorous acid, phosphonic acids such as methanephosphonic acid and phenylphosphonic acid, phosphonous acids such as benzenephosphonous acid, and phosphinic acids such as di-phenylphosphinic acid. Salts of the acids may be used instead of the pure acids. Suitable cations include alkali metal ions, alkaline earth metal ions, zinc ions, and the like.

The catalyst is employed in the amount of 0.01-4.0 mol %, preferably 0.2-2.0 mol %, based on the sum of the dicarboxylic acid and the diamine.

A preferred method for manufacturing the aromatic polyamides is to employ dialkylaminopyridines as co-catalysts along with the catalyst. Particularly suitable dialkylaminopyridines include those with 1-10 C atoms in the alkyl group such as, preferably, 4-dimethylaminopyridine, 4-dibutylaminopyridine, and 4-piperidinylpyridine, with the possibility that a pyrrolidine or piperidine ring can be formed with the amine nitrogen of the pyridine compound.

If a co-catalyst is employed, the amount used is 0.05-4 mol %, preferably 0.2-2 mol %, based on the sum of the dicarboxylic acid and the diamine. Particularly preferred is the use of a co-catalyst in an amount equivalent to that of the catalyst in the reaction mixture.

The reaction is carried out in the melt at temperatures in the range 200°-400° C., preferably 230°-360° C.

Ordinarily, an inert gas atmosphere is used, with normal pressure. Less than atmospheric to superatmospheric pressures may be used, however. To increase the molecular weight, the aromatic polyamides can be subjected to a solid phase post-condensation, also in an inert gas atmosphere.

The glass temperature (Tg) of the aromatic polyamides is in the range 190°–270° C. Viscosity index (J-value) is about 30–250 cc/g, preferably 60–120 cc/g.

The amorphous polyamides (component II) are basically known (Elias, H. G., 1975, "Neue Polymere Werkstoffe", pub. C. Hansser Verlag, Munich/Vienna).

Suitable examples of amorphous polyamides are those produced either from a diamine and a dicarboxylic acid or from α,Ω-aminocarboxylic acids and their corresponding lactams. These polyamides are amorphous if they have no measurable distance-ordering in the absence of component I (Elias, H. G., "Makromolekuele", 5th Ed., pub. Verlag Huethig und Wept, pp. 725–729).

Suitable diamine reactants include those of 2–15 C atoms in the carbon skeleton such as 1,4-butanediamine, 1,6-hexanediamine, 1,8-octanediamine, 1,10-decanediamine, 1,12-dodecanediamine, trimethyl-1,6-hexanediamine, bis(4-aminocyclohcxyl)methane, bis(4-amino-3-methylcyclohexyl)methane, isophoronediamine, and the like. Mixtures of diamines may also be used.

The dicarboxylic acids have 4–40 C atoms in their carbon skeletons and include, e.g., succinic acid, adipic acid, suberic acid, sebacic acid, undecanedicarboxylic acid, dodecanedicarboxylic acid, cyclohexanedicarboxylic acid, terephthalic acid, isophthalic acid, and the like. Mixtures of dicarboxylic acids may also be used.

Suitable compounds for use as α,Ω-aminocarboxylic acids and their lactams are those with 5–14 C atoms in their carbon skeletons, e.g., caprolactam, laurolactam, and the like.

Examples of preferred polyamides are those comprised of units of:
  terephthalic acid and trimethyl-1,6-hexanediamine, in which the terephthalic acid may be substituted to the extent of up to 40 mol % with other dicarboxylic acids, and the trimethyl-1,6-hexanediamine may be substituted to the extent of up to 60 mol % with other aliphatic diamines;
  isophthalic acid and 1,6-hexanediamine, in which the 1,6-hexanediamine may be substituted to the extent of up to 40 mol % with other aliphatic diamines; and
  isophthalic acid, bis(4-amino-3-methylcyclohexyl) methane, and laurolactam, in which the dicarboxylic acid and the diamine are used in approximately equimolar amounts, and the proportion of the laurolactam is 25–45 mol %, based on the entire mixture.

The method of manufacturing the amorphous polyamides is known, e.g., from Eur. OSs 0,053,876 and 0,271,308; Ger. OS 36 00 015; and 1985 Polymer News, 11, 40 ff.

The amorphous polyamides employed in the present molding compounds have a glass transition temperature (Tg) in the range 70°–220° C., preferably 30°–170° C., and viscosity indices (J-values) in the range 30–300 cc/g, preferably 60–200 cc/g.

Components I and II may be intermixed in conventional apparatus, by injection molding or extrusion, and may be processed in conventional apparatus to form molding compounds.

The molding compounds may also contain fillers such as talc or reinforcing materials such as fibers of glass, Aramid ®, or carbon, as well as other customary additives, such as, e.g., pigments and stabilizers.

The present molding compounds are processed to produce molded parts, fibers, sheets, films and the like, by the usual processes such as injection molding, extrusion, and the like. It is also possible to use the materials as coatings based on a powder, e.g., by whirl sintering techniques or a liquid dispersion, or a solution.

It has been found that the present molding compounds have clearly better hot-forming stability and endurance temperatures than molding compounds comprised solely of aromatic polyamides.

Having generally described this invention, a further understanding can be obtained by reference to certain specific examples which are provided herein for purposes of illustration only and are not intended to be limiting unless otherwise specified.

The parameters referred to in the following Examples and elsewhere herein were determined by the following methods:

The glass point (Tg) and melting point (Tm) were determined with a DSC (differential scanning calorimeter) (Mettler TA 3000), at a heating rate of 20° C. per minute.

The viscosity index (J) was determined using 0.5 wt.% solutions of the polyamides in a 1:1 (by wt.) phenol/o-dichlorobenzene mixture at 25° C. (DIN 53 728).

Hot-forming stability (Vicat A/50) was determined according to the procedure of DIN 53 460.

Water uptake was determined gravimetrically according to the procedure of DIN 53 495 (ISO 150 62).

Example A is a comparison example.

EXAMPLES

Example 1

A 4 g amount of an aromatic polyamide comprised of units of isophthalic acid and 4,4'-bis(4-aminophenoxy)-diphenylsulfone in a molar ratio of 1:1 ($Tg=252°$ C., J-value = 65 cc/g) and 36 g of an amorphous polyamide comprised of units of terephthalic acid and trimethyl-1,6-hexanediamine in a molar ratio of 1:1 ($Tg=152°$ C., J-value = 14.2 cc/g) were intermixed in a laboratory kneader (supplied by the firm Haake) for 15 min at 320° C. under a nitrogen atmosphere. The result was a homogeneous blend. Only one Tg value could be determined according to DSC.

J-value = 84 cc/g.    Tg = 155° C.

Examples 2–9

Examples 2–9 were carried out analogously to Example 1, but the mixing ratio of aromatic polyamide to amorphous polyamide was varied. The proportions of the individual components and the properties of the resulting molding compounds are indicated in Table 1.

TABLE 1

| Example | PA* (wt %) | APA** (wt %) | J-value (cm³/g) | $T_g$ (°C.) |
|---|---|---|---|---|
| 1 | 10 | 90 | 84 | 155 |
| 2 | 20 | 80 | 103 | 158 |
| 3 | 30 | 70 | 97 | 164 |
| 4 | 40 | 60 | 74 | 182 |
| 5 | 50 | 50 | 49 | 196 |
| 6 | 60 | 40 | 61 | 205 |
| 7 | 70 | 30 | 57 | 214 |
| 8 | 80 | 20 | 43 | 222 |
| 9 | 90 | 10 | 50 | 238 |

PA* - Aromatic polyamide
APA** - Amorphous polyamide

Examples 10-12

Granular mixtures corresponding to each of Examples 1-3, respectively, were mixed in the melt on a dual-screw kneader (type ZSK 30 supplied by Werner and Pfleiderer) at 340° C. housing temperature and a throughput of 7 kg/hr, followed by granulation. Under these conditions a transparent blend was obtained which was processed to form test bodies. The properties of these test bodies are indicated in Table 2.

TABLE 2

| Example | PA* (wt %) | APA** (wt %) | $T_g$ (°C.) | VICAT A/50 (°C.) | Water uptake | VICAT A/50 (°C.) |
|---|---|---|---|---|---|---|
| 10 | 10 | 90 | 155 | 149 | 5.26 | 90 |
| 11 | 20 | 80 | 158 | 153 | 4.78 | 98 |
| 12 | 30 | 70 | 164 | 160 | 4.37 | 108 |
| A | 0 | 100 | 154 | 147 | 5.77 | 87 |

PA* - Aromatic polyamide
APA** - Amorphous polyamide

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A polyamide molding compound, comprising:
   I. an aromatic polyamide having the structure

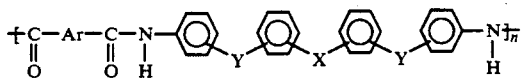

wherein

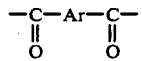

designates an isophthalic acid, terephthalic acid or 1,4-,1,5,-2,6- or 2,7-naphthalene dicarboxylic acid radical, n is a number ranging from 5 to 500; X represents —SO$_2$— or —CO—, and Y represents —O— or —S—; and II. an amorphous polyamide prepared by reacting a diamine reactant containing from 2-15 carbon atoms in its carbon skeleton with a C$_{4-40}$ dicarboxylic acid or prepared by the polymerization of an α,ω-amino (C$_{5-14}$) carboxylic acid or lactam thereof.

2. The molding compound according to claim 1, wherein the ratio by weight of component I to component II is in the range 99:1 to 1:99.

3. The molding compound according to claim 2, wherein the ratio by weight of component I to component II is in the range 90:10 to 10:90.

4. The molding compound according to claim 1, wherein the aromatic polyamide (I) is prepared by reacting isophthalic acid, terephthalic acid, or 1,4-, 1,5-, 2,6- or 2,7-naphthalenedicarboxylic acid, with 4,4'-bis(4-aminophenoxy)diphenylsulfone, 4,4'-bis(3-aminophenoxy)diphenyl sulfone, 4,4'-bis(4-aminophenoxy)-benzophenone, 4,4'-bis(3-aminophenoxy)benzophenone, 4,4'-bis(p-aminophenylmercapto) benzophenone, 4,4'-bis(p-aminophenylmercapto)diphenylsulfone, or mixtures thereof.

5. The molding compound according to claim 1, wherein the amorphous polyamide has a glass transition temperature (Tg) in the range of 70°-220° C. and a viscosity index in the range of 30-300 cm$^3$/g.

6. The molding compound of claim 1, wherein said diamine reactant of polyamide II is 1,4-butanediamine, 1,6-hexanediamine, 1,8-octanediamine, 1,10-decanediamine, 1,12-dodecanediamine, trimethyl-1,6-hexanediamine, bis(4-aminocyclohexyl)methane, bis(4-amino-3-methylcyclohexyl)methane or isophoronediamine.

7. The molding compound of claim 1, wherein said dicarboxylic acid of polyamide II is succinic acid, adipic acid, suberic acid, sebacic acid, undecanedicarboxylic acid, dodecanedicarboxylic acid, cyclohexanedicarboxylic acid, terephthalic acid or isophthalic acid.

8. The molding compound of claim 1, wherein said lactam is caprolactam or laurolactam.

* * * * *